Figure 3:
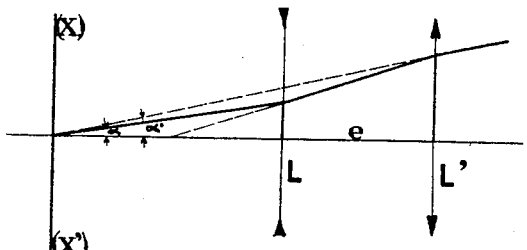

Feb. 14, 1933.    G. CHRETIEN    1,897,752
ANAMORPHOSER APPARATUS FOR CINEMATOGRAPHY IN COLORS AND IN RELIEF
Filed Nov. 28, 1927    2 Sheets-Sheet 1
Fig.1    Fig.2
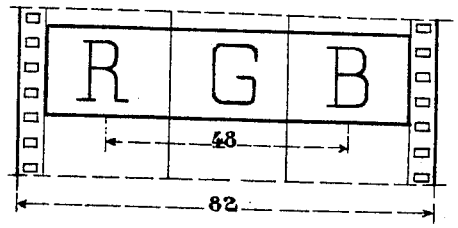
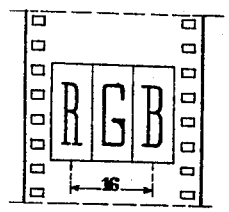
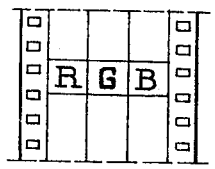
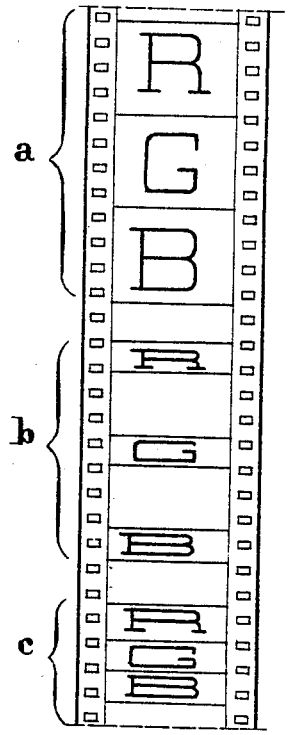
Inventor:
G. Chretien
By Langner, Parry Card & Langner
Attys Feb. 14, 1933.   G. CHRETIEN   1,897,752
ANAMORPHOSER APPARATUS FOR CINEMATOGRAPHY IN COLORS AND IN RELIEF
Filed Nov. 28, 1927   2 Sheets-Sheet 2

Inventor:
G. Chretien
by Langner, Parry, Card & Langner
Attys.

Patented Feb. 14, 1933

1,897,752

UNITED STATES PATENT OFFICE

GEORGES CHRETIEN, OF ST.-CLOUD, FRANCE, ASSIGNOR TO SOCIETE TECHNIQUE D'OPTIQUE ET DE PHOTOGRAPHIE S. T. O. P., OF ST.-OUEN, SEINE, FRANCE

ANAMORPHOSER APPARATUS FOR CINEMATOGRAPHY IN COLORS AND IN RELIEF

Application filed November 28, 1927, Serial No. 236,330, and in France December 9, 1926.

When attempts are made to apply polychrome processes to color photography numerous difficulties are met with:

(a) It is necessary to obtain a number of distinct negatives taken from a single point of view. This result is arrived at either by decomposing the luminous bundle of rays emerging from an ordinary photographic objective into as many bundles of rays as is necessary, by the interposition of partially reflecting and transparent surfaces, or by taking the monochrome negatives by means of an equal number of separate objectives, the axes of which should be as close together as possible, for the purpose of mitigating the effects of parallax, which are always extremely detrimental.

(b) For restoring or projecting it is then necessary to superpose the various chromograms.

These difficulties become acute in the case of cinematography, by reason of the space occupied by the images, which necessitates the use of special films and apparatus both for photographing the views—which is not generally considered as very serious—, and for the projection, which constitutes a fundamental obstacle to the general use of all these processes.

Attempts have been made to remedy these defects by reducing the dimensions of the images.

The remedy however is only partial as, amongst other disadvantages, this reduction generally brings with it a change in the spacing or the interval of the successive groups of images through which the film should be advanced between each exposure; in other words this reduction also brings with it, finally, a change in the apparatus.

It has also been proposed to incorporate in juxtaposition a multiple number of color pictures into the space normally occupied by a single view and to later superimpose these various chromograms by projection, but the prior proposed arrangements are unsatisfactory due to insufficient and imperfect correction for parallax and aberrations. The object of the present invention is an apparatus for effecting this purpose whereby corrections for parallax and aberrations may be practically effected with due regard to the comparatively long exposures especially in the red band and the large objective openings which are essential in color work. To these ends the invention resides in a photographic or projection apparatus including a special arrangement and adjustment of cylindrical lenses and ordinary objectives positioned very close together before the film.

Figure 4:
Figure 5:
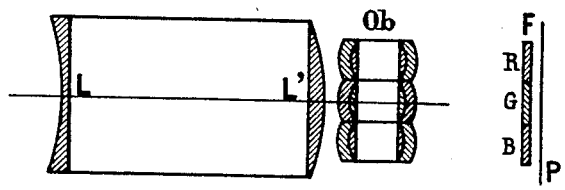

For a better understanding of the invention reference may be had to the accompanying drawings wherein:

Figs. 1a, 1b, 1c, 1d and 2 are general views of cinema films indicating the application of the invention thereto, and Figs. 3, 4 and 5 are diagrammatic views relating to the apparatus embodying the invention.

Fig. 1a indicates a group of three cinematographic views of normal size (18 x 24 mm.) arranged for the trichromatic process. It will be seen:

1. That the width of the film should be 82 mm. = $(3 \times 24) + (2 \times 5)$ mm.

2. That the distance between the axes of the outer objectives is 48 mm. which produces an important parallax of the three images, which parallax is made apparent by colored fringes of the most disagreeable effect.

In Fig. 1b are shown the three images of Fig. 1a simply reduced in width, each to one-third of the normal width, by simple interposition between the object and the objectives, of a special optical device, an element of the invention, called "local anamorphoser".

Finally in Fig. 1c will be seen the three anamorphosic images which have been drawn close together by the combined use of an anamorphoser and a multiple objective, a characteristic combination of the invention. The three images, thus anamorphosized and brought close together then occupy the space of an ordinary image.

The distance between the outer objectives is now 16 mm. that is to say one-third of that in the ordinary case illustrated in Figure 1a. But the parallax is not reduced only to one-third, but to one-ninth of its preceding value and the colored fringes become practically imperceptible, for not only are the three objectives brought so close together as to present between themselves distances or intervening spaces three times smaller, but as viewed from the subject to be photographed these objectives appear themselves reduced three times in size. This property constitutes one of the most valuable advantages of the invention for application to color photography. This is particularly the case when the anamorphoser is used for reducing the width of the images. In fact if the enlargement produced by the apparatus is indicated by $g$, not only is the distance of the optical axes of the outer objectives multiplied by $g$ but moreover, when one looks at these objectives through the anamorphoser they appear to be reduced in dimensions by the latter and their axes present themselves at an apparent distance equal to their actual distance multiplied by $g$. The result is that the parallax is multiplied by $g^2$. Hence the parallax is reduced to one ninth when $g=\tfrac{1}{3}$ as in the case of trichromatic photography given by way of example.

The principle of the invention may also be applied by selecting the system of objectives so as to obtain directly reduced images and by expanding these in a direction at right angles to the preceding one by means of a similar anamorphoser, but turned over end for end and directed at a right angle to the position adopted in the preceding case.

For example in the case of the three images shown in Fig. 1a one may use objectives having a focal length three times shorter than for obtaining Figure 1a, and three juxtaposed images of 6 by 8 mm. (Figure 1d) will thus be obtained. Then by the interposition of an anamorphoser enlarging three times in the vertical direction there will be imparted thereto the desired configuration which preserves the spacing (Figure 1c).

It is obvious that the same general means, forming the feature of the invention, may be applied when producing anamorphosis in the direction of height, in such a manner as to reduce the space occupied by the multiple images to that of a single one in the direction of movement of the film as is indicated in Figure 2 at $a$, $b$ and $c$.

It may furthermore be noted that the reduction of the total width, to that of a single image is fully necessary only in the case of projection. When photographing views, the reduction of the space occupied may be less, if, for particular reasons—luminosity for example—it is found advantageous to use films of a width different from the normal.

Finally, it is possible to apply the anamorphosis also to the constitution of images adapted to be projected definitely, made from originals taken with any camera, or even from photographic negatives obtained in the ordinary manner. This particularly finds its application in the case of stereoscopy.

The optical system which is used for carrying this process into effect and which constitutes one of the essential features of the invention results from the combination of two essential parts:

A. A local anamorphoser.

B. An ordinary system of objectives.

A. The local anamorphoser is an optical combination of two systems of cylindrical lenses disposed one behind the other so that their axial planes register. In order to reduce the objectionable aberrations of the system, the cylindrical lenses composing said system may be formed of a plurality of simple lenses (of which some may be cemented together) calculated according to known principles, similar to those applied to optical systems of revolution about an axis.

But, in order to simplify the description it may be assumed that each system is composed of a single thin lens. It is known how to consider subsequently the thicknesses.

In Figure 3 is illustrated diagrammatically a cross section of the anamorphoser system assumed to be reduced to two thin lenses L and L'.

Between the focal length $f$ and $f'$ of these lenses and the distance $e = L L'$, which separates them, such ratios are laid down which enable the following conditions to be satisfied.

1. The image X' of the plane X of the object produced by the luminous rays should register with the plane of the object itself. In other words the image-plane and the object plane sholud coincide.

2. The enlargement $g$ of this image should have a given value. For example in the case under consideration in Figs. 1a and 1b $g$ will be equal to one-third, and in the case in Figs. 1d and 1c it is assumed that $g=3$.

If one represents in size and in sign, by $x = LX$, the distance of the object from the first lens; by $x' = L'X$, the distance of the image from the second lens and if $x$, $f$, $g$ are given, the elementary optics allow to calculate easily the quantities $e$ and $f$.

It will thus be found:

$$e = \frac{1 - \tfrac{1}{g}}{1 + \left(\tfrac{1-1}{g}\right)\tfrac{f}{x}} f,$$

$$x' = x - e$$

$$f' = -\frac{f}{g} \frac{1}{1 + \left(\tfrac{g-1}{g}\tfrac{f}{x}\right)2}$$

The space occupied by the system is of the order of $$e_o = \left(1 - \tfrac{1}{g}\right) f$$

it is therefore convenient, if it is desired to reduce it, to take short focal lengths and high power. But this causes, on the other hand, difficulties in the correction of aberrations. There is therefore an advantage in selecting lenses of low power, that is of large focal length.

The distance $x$ is generally large as compared to $f$. The value of $f'$ is fixed once and for all and the distance $e$ is adjusted according to the various distances of the subject.

At a finite but large distance $x$, the variation $\delta e$ of the distance of the lenses measured from $$e_o = f + f'$$

is:

$$e = \frac{f' - f}{x} e_o$$

The objective being focussed at the infinity the variation of the extension of the chamber starting from the focussing position for the distance $x$ is, on the other hand:

$$\delta x' = -\frac{F^2}{x}$$

It will be seen that the displacements $\delta e$ and $\delta x'$ are proportional and may consequently be combined mechanically in a very simple manner so that the focussing at the same time ensures correction of the astigmatism of the anamorphoser.

The enlargement will be very slightly variable in the neighbourhood of its theoretical value, but in a negligible manner.

B. The system of objectives comprises as many photographic (or projecting) objectives of ordinary type as there are elementary images to be photographed or projected: two in the case of stereoscopy or of bichromatic photography; three in the case of trichromatic photography.

The optical axes of these objectives are placed in the same plane at distances from each other equal to those of the images to be obtained.

In order to allow the axes to be drawn close together to the desired value when the diameter of the lenses of the objectives is greater than this distance, they may be cut according to two planes parallel to the axis at the suitable distance as will be seen on Figure 4.

Figure 5 shows by way of descriptive example an optical unit for trichromic photography, established in accordance with the invention.

L is the diverging cylindrical lens of $-12$ dioptries.

L' is a convergent cylindrical lens of $+4$ dioptries.

$Ob$ is a system of three ordinary objectives.

F is the system of the three selecting filters, red, green and blue for example.

P is the position of the sensitized surface.

The theory of anamorphotic systems has been given by Abbe who has described combinations formed by crossed cylindrical lenses which is a necessity when assuming the general case imagined by Abbe.

The case of images at the points of Bravais is a case of degeneracy of the general theory which makes exception to the case imagined by Abbe in the sense that it leads to the use of cylindrical lenses having the generatrices all parallel.

It will be observed that the present invention permits of the use in color photography of the standard panchromatic films, of the obtention of negative images and consequently of the ability of making an unlimited number of positive copies and requires no modification of the essential elements of present cameras and projection apparatus. The present invention provides means for eliminating detrimental chromatic parallax and provides the same tolerance for focussing as in black and white photography.

I claim:

1. In an apparatus of the class described, the combination with a plurality of color screens of an optical unit comprising a diverging cylindrical lens followed by a converging cylindrical lens of lesser absolute power and a plurality of spherical objectives equal in number to the number of the color screens and positioned between said screens and said converging cylindrical lens, said cylindrical lenses having their generating lines parallel, and the axes of said objectives being parallel and in the same plane as the central cross section of said cylindrical lenses whereby images optically compressed in one direction of objects in the plane of the virtual image formed by said cylindrical lenses may be reproduced upon a sensitive film positioned behind said screens and images from a positive film positioned behind said screens may be projected through said unit and screens upon a surface positioned in the plane of the virtual image formed by said cylindrical lenses.

2. An apparatus with reduced parallax for photography in colors comprising a local anamorphoser consisting of one cylindrical diverging lens followed by one cylindrical convergent lens of lesser absolute power, both lenses having parallel generating lines and being disposed at such a distance from one another that a virtual image is formed in the same plane as the object to be photographed, said anamorphoser being followed by a plurality of conventional spherical objectives the optical axes of which are parallel and are contained in the plane of the central cross section of said cylindrical lens, said objectives being placed in close vicinity of the converging cylindrical lens and with their optical axes close to one another in front of an equal number of color screens facing a light sensitive surface.

3. An apparatus for projection in color photography adapted to be placed in the path of light rays passing through a film divided into a plurality of areas containing each an anamorphosed image corresponding to different colors of the same scene, each of the areas being placed before a corresponding color filter, said apparatus comprising a number of conventional spherical objectives corresponding to the number of said areas and facing said areas and screens, the optical axes of said objectives being placed close to one another followed closely by an anamorphoser, said anamorphoser comprising a convergent cylindrical lens followed by a divergent cylindrical lens of greater power placed so that the image coincides in space with the one primitively formed by the spherical objectives.

In testimony whereof I have signed my name to this specification.

GEORGES CHRETIEN.